(12) United States Patent
Jin

(10) Patent No.: US 9,098,800 B2
(45) Date of Patent: Aug. 4, 2015

(54) APPARATUS AND METHOD FOR MANAGING AXIOM, AND REASONING APPARATUS INCLUDING THE SAME

(75) Inventor: Weon-II Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 281 days.

(21) Appl. No.: 13/488,874

(22) Filed: Jun. 5, 2012

(65) Prior Publication Data

US 2013/0138600 A1   May 30, 2013

(30) Foreign Application Priority Data

Nov. 30, 2011   (KR) .................. 10-2011-0126922

(51) Int. Cl.
| G06F 17/00 | (2006.01) |
| G06N 7/00 | (2006.01) |
| G06N 7/08 | (2006.01) |
| G06N 5/02 | (2006.01) |

(52) U.S. Cl.
CPC ....................................... *G06N 5/02* (2013.01)

(58) Field of Classification Search
None
See application file for complete search history.

(56) References Cited

U.S. PATENT DOCUMENTS

| 2011/0055240 A1* | 3/2011 | Li et al. .................. 707/759 |
| 2011/0238610 A1 | 9/2011 | Lee et al. |
| 2011/0246407 A1 | 10/2011 | Lee et al. |

FOREIGN PATENT DOCUMENTS

| KR | 10-2010-0055173 | 5/2010 |
| KR | 10-2010-0068981 | 6/2010 |
| KR | 10-2010-0068983 | 6/2010 |
| KR | 10-2011-0059260 | 6/2011 |

OTHER PUBLICATIONS

Grosof, Benjamin N., et al. "Description logic programs: Combining logic programs with description logic." Proceedings of the 12th international conference on World Wide Web. ACM, 2003.*
Stoilos, Giorgos, et al. "Fuzzy OWL: Uncertainty and the Semantic Web." OWLED. 2005.*
McGuinness, Deborah L., and Frank Van Harmelen. "OWL web ontology language overview." W3C recommendation 10.2004-03 (2004): 10.*
Motik, Boris, et al. "OWL 2 web ontology language: Structural specification and functional-style syntax." W3C recommendation 27 (2009): 17.*
Motik, Boris, Ulrike Sattler, and Rudi Studer. "Query answering for OWL-DL with rules." The Semantic Web—ISWC 2004. Springer Berlin Heidelberg, 2004. 549-563.*
Seidenberg, Julian, and Alan Rector. "Representing transitive propagation in OWL." Conceptual Modeling-ER 2006. Springer Berlin Heidelberg, 2006. 255-266.*
Baumeister, Joachim, and Dietmar Seipel. "Verification and refactoring of ontologies with rules." Managing Knowledge in a World of Networks. Springer Berlin Heidelberg, 2006. 82-95.*

(Continued)

*Primary Examiner* — Kakali Chaki
*Assistant Examiner* — Daniel Pellett
(74) *Attorney, Agent, or Firm* — NSIP Law

(57) ABSTRACT

A method of managing an axiom includes determining if an H in an A→H axiom in existing axioms is a predetermined expression; and if the H is the predetermined expression, collecting, from the existing axioms, a B→I axiom in which the B includes the H, deleting the A→H axiom from the existing axioms, and generating a new B→I axiom from the collected B→I axiom by replacing the H in the B with the A.

12 Claims, 4 Drawing Sheets

(56) References Cited

OTHER PUBLICATIONS

Antoniou, Grigoris, and Frank Van Harmelen. "Web ontology language: Owl." Handbook on ontologies. Springer Berlin Heidelberg, 2004. 67-92.*

Horrocks, Ian, and Ulrike Sattler. "Decidability of SHIQ with complex role inclusion axioms." Proceedings of the 18th international joint conference on Artificial intelligence. Morgan Kaufmann Publishers Inc., 2003.*

* cited by examiner x is Parent → x hasChild y
x is Man, x hasChild y → x is Father x is Man, x hasChild y → x is Father
x is Man, x is Parent → x is Father

APPARATUS AND METHOD FOR MANAGING AXIOM, AND REASONING APPARATUS INCLUDING THE SAME

CROSS-REFERENCE TO RELATED APPLICATIONS

This application claims the benefit under 35 USC 119(a) of Korean Patent Application No. 10-201 1-01 26922 filed on Nov. 30, 2011, in the Korean Intellectual Property Office, the entire disclosure of which is incorporated herein by reference for all purposes.

BACKGROUND

1. Field

The following description relates to a technique for ontology reasoning.

2. Description of the Related Art

An ontology is a formal representation of a set of concepts within a domain, and of relationships between those concepts. An ontology may be used to perform reasoning about entities of the domain, and to describe the domain.

Ontology reasoning may be performed using an assertion management apparatus, such as an assertion box (ABox), that contains facts as assertions, an axiom management apparatus, such as a terminological box TBox that contains facts as axioms, and a reasoner that performs reasoning using the assertions and the axioms.

SUMMARY

According to an aspect, a method of managing an axiom includes determining if an H in an A→H axiom in existing axioms is a predetermined expression; and if the H is the predetermined expression, collecting, from the existing axioms, a B→I axiom in which the B includes the H, deleting the A→H axiom from the existing axioms, and generating a new B→I axiom from the collected B→I axiom by replacing the H in the B with the A.

The method of claim 1, may further include adding the new B→I axiom to the existing axioms.

The determining may include determining if the H in the A→H axiom is an existential expression.

The existential expression may be $\exists R.C$ or $\geq n\ R$ (n>0).

According to an aspect, a method of managing an axiom includes determining if an A or an H in an A→H axiom in existing axioms is a predetermined expression; and if the A or the H is the predetermined expression, deleting the A→H axiom from the existing axioms.

The determining may include determining if the H in the A→H axiom is a disjunction expression.

The disjunction expression may be $\{o1, o2, \ldots, ok\}$ (k>1), or $\leq n\ R$, or $C \cup D$.

The determining may include determining if the A in the A→H axiom is a negation expression.

The negation expression may be $\forall R.C$, or $\bot$, or $\leq n$, or $\geq n\ R$ (n>0), or $\neg A$ (atomic negation), or $\neg T$.

According to an aspect, an apparatus for managing an axiom includes a determining unit configured to determine if an H in an A→I axiom in existing axioms is a predetermined expression; and a generating unit configured to, if the H is the predetermined expression, collect, from the existing axioms, a B→I axiom in which the B includes the H, delete the A→H axiom from the existing axioms, and generate a new B→I axiom from the collected B→I axiom by replacing the H in the B with the A.

The apparatus may further include an adding unit configured to add the new B→I axiom to the existing axioms.

The determining unit may be further configured to determine if the H in the A→H axiom is an existential expression.

The existential expression may be $\exists R.C$ or $\geq n\ R$ (n>0).

According to an aspect, a reasoning apparatus includes a terminological box (TBox) containing axioms and configured to determine if an H in an A→H axiom in the axioms in the TBox is a predetermined expression, and if the H is the predetermined expression, collect, from the axioms in the TBox, a B→I axiom in which the B includes the H, delete the A→H axiom from the axioms in the TBox, and generate a new B→I axiom from the collected B→I axiom by replacing the H in the B with the A. The reasoning apparatus further includes a reasoner configured to receive, from the TBox, an axiom in the axioms in the TBox, and perform reasoning based on the axiom received from the TBox.

The TBox may be further configured to add the new B→I axiom to the axioms in the TBox.

The TBox may be further configured to determine if the H in the A→H axiom is an existential expression.

The existential expression may be $\exists R.C$ or $\geq n\ R$ (n>0).

Other features and aspects will be apparent from the following detailed description, the drawings, and the claims.

DETAILED DESCRIPTION

Figure 1:
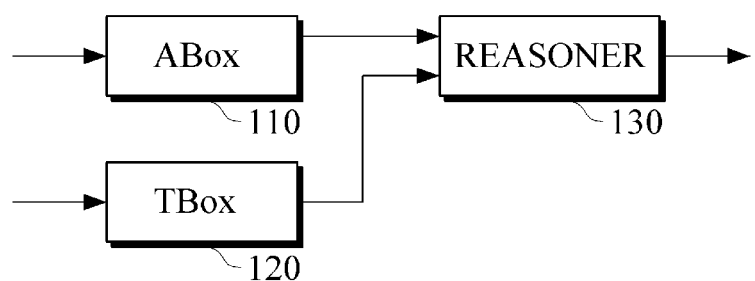
FIG. 1 is a diagram illustrating an example of a reasoning apparatus.

The following description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. Also, descriptions of well-known functions and constructions may be omitted for increased clarity and conciseness.

Throughout the drawings and the detailed description, the same drawing reference numerals refer to the same elements. The relative size and depiction of these elements may be exaggerated for clarity, illustration, and convenience.

FIG. 1 illustrates a diagram illustrating an example of a reasoning apparatus. A reasoning apparatus includes an ABox 110, a TBox 120, and a reasoner 130.

The ABox 110 contains assertions, and the TBox 120 contains axioms. Reasoning is a series of logical actions or processes to derive a conclusion from known facts, such as assertions and axioms. The reasoner 130 receives assertions from the ABox 110 and axioms from the TBox 120, and performs reasoning based on the assertions and axioms. ABoxes, TBoxes, and reasoners in general are well known in the art, and thus will not be described in detail herein.

However, the TBox 120 of this example performs additional functions besides the basic functions performed by a conventional TBox. The TBox 120 of this example determines if an A or an H in an A→H axiom in the axioms in the TBox 120 is a predetermined expression requiring complex reasoning. If the TBox 120 determines that the A and the H are not predetermined expressions requiring complex reasoning, the TBox 120 ends processing of the A→H axiom. If the TBox 120 determines that the A or the H is a predetermined expression requiring complex reasoning, the TBox 120 determines a type of the predetermined expression requiring complex reasoning.

An example of a predetermined expression requiring complex reasoning is an existential expression, such as $\exists R.C$ or $\geq n\ R\ (n>0)$, both of which are well known in the art, and thus will not be described in detail here. If the TBox 120 determines that the H in the A→H axiom is an existential expression, the TBox 120 collects a B→I axiom in which the B includes the H from the axioms in the TBox 120, deletes the A→H axiom from the axioms in the TBox 120, generates a new B→I axiom from the collected B→I axiom by replacing the H in the B with the A, and adds the new B→I axiom to the axioms in the TBox 120.

Another example of a predetermined expression requiring complex reasoning is a disjunction expression, such as $\{o1, o2, \ldots, ok\}$ $(k>1)$, or $\leq n\ R$, or $C \cup D$, all of which are well known in the art, and thus will not be described in detail here. If the TBox 120 determines that the H in the A→I axiom is a disjunction expression, the TBox 120 deletes the A→I axiom from the axioms in the TBox 120 without generating a new axiom.

Another example of a predetermined expression requiring complex reasoning is a negation expression, such as $\forall R.C$, or $\bot$, or $\leq n$, or $\geq n\ R\ (n>0)$, or $\neg A$ (atomic negation), or $\neg \top$, all of which are well known in the art, and thus will not be described in detail here. If the TBox 120 determines that the A in the A→H axiom is a negation expression, the TBox 120 deletes the A→H axiom from the axioms in the TBox 120 without generating a new axiom.

Figure 2:
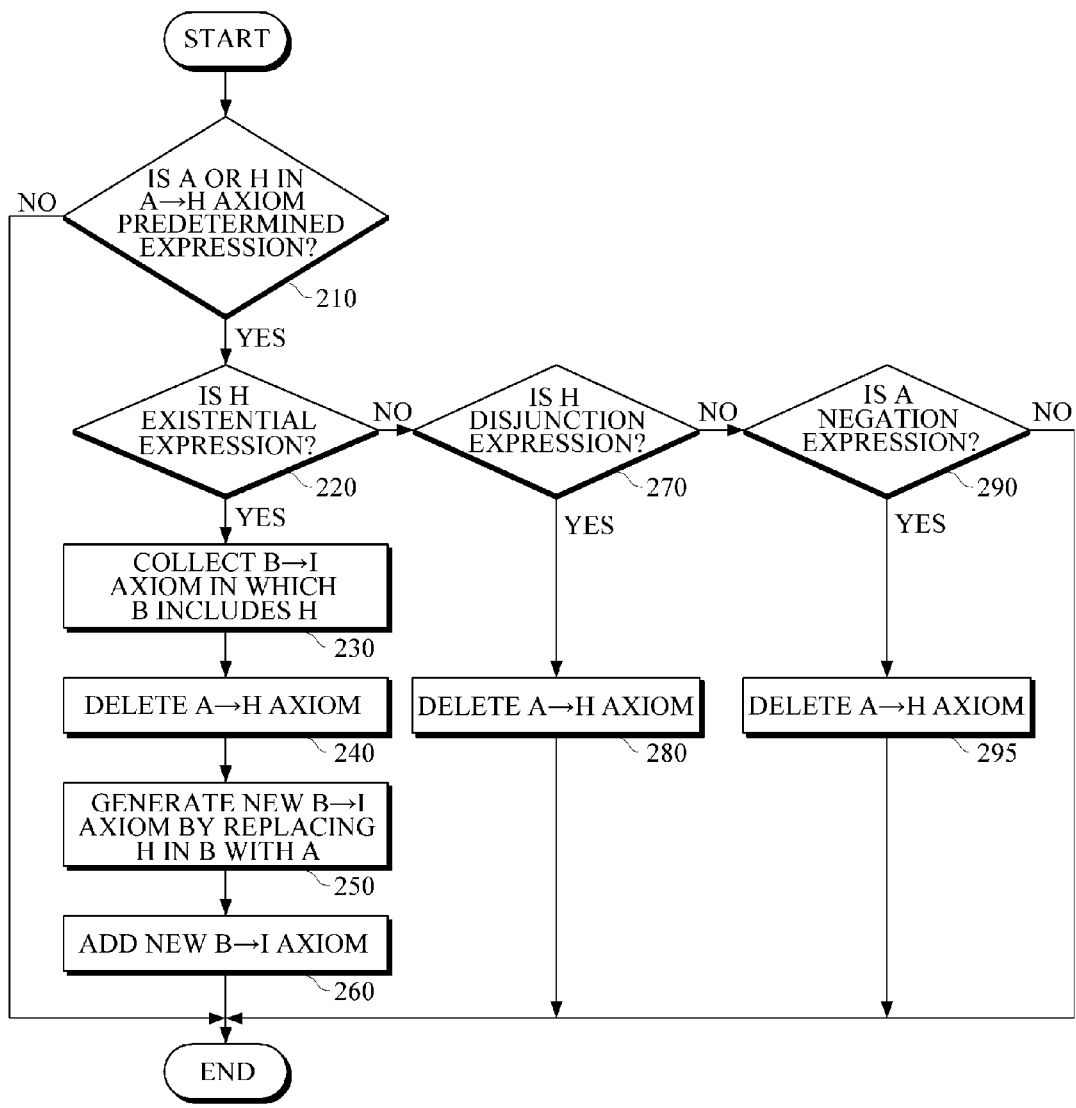
FIG. 2 is a flowchart illustrating an example of a method of managing an axiom.

FIG. 2 is a flowchart illustrating an example of a method of managing an axiom that may be performed in a TBox for ontology reasoning, such as the TBox 120 in FIG. 1. First, in 210, it is determined if an A or an H in an A→H axiom in existing axioms is a predetermined expression requiring complex reasoning. As described above, examples of a predetermined expression requiring complex reasoning include an existential expression, such as $\exists R.C$ or $\geq n\ R\ (n>0)$, a disjunction expression, such as $\{o1, o2, \ldots, ok\}$ $(k>1)$, or $\leq n\ R$, or $C \cup D$, and a negation expression, such as $\forall R.C$, or $\bot$, or $\leq n$, or $\geq n\ R\ (n>0)$, or $\neg A$ (atomic negation), or $\neg \top$. If it is determined in 210 that the A or H in A→H axiom is a predetermined expression requiring complex reasoning, the process proceeds to 220. Otherwise the process ends.

In 220, it is determined if the H in the A→H axiom is an existential expression, such as $\exists R.C$ or $\geq n\ R\ (n>0)$.

If it is determined in 220 that the H in the A→H axiom is an existential expression, a B→I axiom in which the B includes the H is collected from the existing axioms in 230, the A→H axiom is deleted from the existing axioms in 240, a new B→I axiom is generated from the collected B→I axiom in 250 by replacing the H in the B with the A, the new B→I axiom is added to the existing axioms in 260, and then the process ends.

If is determined in 220 that the H in the A→H axiom is not an existential expression, the process proceeds to 270.

In 270, it is determined if the H in the A→H axiom is a disjunction expression, such as $\{o1, o2, \ldots, ok\}$ $(k>1)$, or $\leq n\ R$, or $C \cup D$.

If it is determined in 270 that the H in the A→H axiom is a disjunction expression, the A→H axiom is deleted from the existing axioms in 280 without generating a new axiom, and then the process ends.

If is determined in 270 that the H in the A→H axiom is not a disjunction expression, the process proceeds to 290.

In 290, it is determined if the A in the A→H axiom is a negation expression, such as $\forall R.C$, or $\bot$, or $\leq n$, or $\geq n\ R\ (n>0)$, or $\neg A$ (atomic negation), or $\neg \top$.

If it is determined in 290 that the A in the A→H axiom is a negation expression, the A→H axiom is deleted from the existing axioms in 295 without generating a new axiom, and then the process ends.

If it is determined in 290 that the A in the A→H axiom is not a negation expression, the process ends.

Figure 3:
FIG. 3 is a diagram illustrating an example of generating an axiom according to an axiom management method.

FIG. 3 is a diagram illustrating an example of generating an axiom according to an axiom management method. As shown in FIG. 3, this example assumes that existing axioms include an A→H axiom stating that 'x is Parent→x hasChild y', and a B→I axiom stating that 'x is Man, x hasChild y→x is Father'. In the A→H axiom, the A is 'x is Parent', and the H is 'x hasChild y'. In the B→I axiom, the B is 'x is Man, x hasChild y', and the I is 'x is Father'. The B 'x is Man, x hasChild y' in the B→I axiom includes the H 'x hasChild y' of the A→H axiom.

As described above, it is determined that the H 'x hasChild y' in the A→H axiom 'x is Parent→x hasChild y' is a predetermined expression requiring complex reasoning because the H 'x hasChild y' is an existential expression $\exists R.C$. Next, the B→I axiom 'x is Man, x hasChild y→x is Father' in which the B 'x is Man, x hasChild y' includes the H 'x hasChild y' is collected. Next, the A→H axiom 'x is Parent→x hasChild y' is deleted from the existing axioms. Next, a new B→I axiom 'x is Man, x is Parent→x is Father' is generated from the collected B→I axiom 'x is Man, x hasChild y→x is Father' by replacing the H 'x hasChild y' in the B 'x is Man, x hasChild y' with the A 'x is Parent'. Next, the new B→I axiom 'x is Man, x is Parent→x is Father' is added to the existing axioms.

Figure 4:
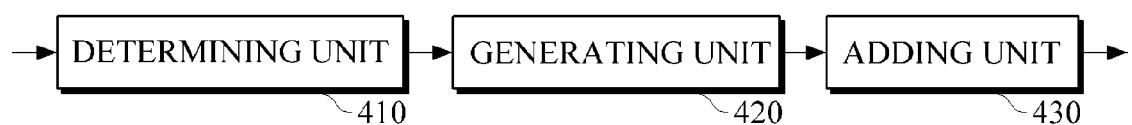
FIG. 4 is a diagram illustrating an example of an axiom management apparatus.

FIG. 4 illustrates a diagram illustrating an example of an axiom management apparatus that may be a TBox for ontology reasoning, such as the TBox 120 in FIG. 1. Referring to FIG. 4, the axiom management apparatus includes a determining unit 410, a generating unit 420, and an adding unit 430. The determining unit 410 determines if an A or an H in an A→H axiom in existing axioms is a predetermined expression requiring complex reasoning. As described above, examples of a predetermined expression requiring complex reasoning include an existential expression, such as $\exists R.C$ or $\geq n\ R\ (n>0)$, a disjunction expression, such as $\{o1, o2, \ldots, ok\}$ $(k>1)$, or $\geq n\ R$, or $C \cup D$, and a negation expression, such as $\forall R.C$, or $\bot$, or $\leq n$, or $\geq n\ R\ (n>0)$, or $\neg A$ (atomic negation), or $\neg \top$.

If the determining unit 410 determines that the H in the A→H axiom is an existential expression, such as $\exists R.C$ or $\geq n\ R\ (n>0)$, the generating unit 420 collects a B→I axiom in which the B includes the H from the existing axioms, deletes the A→H axiom from the existing axioms, and generates a new B→I axiom from the collected B→I axiom by replacing the H in the B with the A.

If the determining unit 410 determines that the H in the A→H axiom is a disjunction expression, such as $\{o1, o2, \ldots, ok\}$ $(k>1)$, or $\leq n\ R$, or $C \cup D$, the generating unit 420 deletes the A→H axiom from the existing axioms without generating a new axiom.

If the determining unit 410 determines that the A in the A→H axiom is a negation expression, such as $\forall R.C$, or $\bot$, or $\leq n$, or $\geq n\ R\ (n>0)$, $\neg A$ (atomic negation), or $\neg \top$, the generating unit 420 deletes the A→H axiom from the existing axioms without generating a new axiom.

If the generating unit 420 generated a new B→I axiom, the adding unit 430 adds the new B→I axiom to the existing axioms.

According to the examples described above, it is possible to reduce reasoning time spent by an ontology reasoning engine and to improve the accuracy of the reasoning result in context-awareness system. That is, in reasoning based on ontology, a complex axiom is replaced with a simple axiom in an ontology TBox, and thereby the reasoning performance can be enhanced.

The ABox 110, the TBox 120, and the reasoner 130 in FIG. 1 and the determining unit 410, the generating unit 420, and the adding unit 430 in FIG. 4 may be implemented using hardware components and/or software components. Software components may be implemented by a processing device, which may be implemented using one or more general-purpose or special-purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purposes of simplicity, the description of a processing device is used as singular; however, one skilled in the art will appreciate that a processing device may include multiple processing elements and multiple types of processing elements. For example, a processing device may include multiple processors or a processor and a controller. In addition, different processing configurations are possible, such a parallel processors.

As used herein, a processing device configured to implement a function A includes a processor programmed to run specific software. In addition, a processing device configured to implement a function A, a function B, and a function C may include configurations, such as, for example, a processor configured to implement functions A, B, and C; a first processor configured to implement function A and a second processor configured to implement functions B and C; a first processor configured to implement functions A and B and a second processor configured to implement function C; a first processor to implement function A, a second processor configured to implement function B, and a third processor configured to implement function C; a first processor configured to implement functions A, B, C and a second processor configured to implement functions A, B, and C, and so on.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion.

In particular, the software and data may be stored by one or more non-transitory computer-readable storage mediums. The non-transitory computer-readable storage medium may include any data storage device that can store data that can be thereafter read by a computer system or processing device. Examples of a non-transitory computer-readable storage medium include read-only memory (ROM), random-access memory (RAM), CD-ROMs, magnetic tapes, floppy disks, and optical data storage devices. Also, functional programs, codes, and code segments for implementing the examples disclosed herein can be easily constructed by programmers skilled in the art to which the examples pertain based on the drawings and their corresponding descriptions as provided herein.

While this disclosure has been particularly shown and described with reference to examples thereof, it will be understood by one of ordinary skill in the art that various changes in form and details may be made in these examples without departing from the spirit and scope of the invention as defined by the claims and their equivalents. It should be understood that the examples described herein should be considered in a descriptive sense only, and not for purposes of limitation. Descriptions of features or aspects in each example are to be considered as being applicable to similar features or aspects in other examples. Suitable results may be achieved if the described techniques are performed in a different order and/or if components in a described system, architecture, device, or circuit are combined in a different manner and/or replaced or supplemented by other components or their equivalents. Therefore, the scope of the invention is defined not by the detailed description of the disclosure, but by the claims and their equivalents, and all variations within the scope of the claims and their equivalents are to be construed as being included in the invention.

What is claimed is:

1. A method of managing an axiom, the method comprising:
    determining, using a determining processing device, whether an H expression in an A→H axiom in existing axioms is a predetermined expression, wherein the determining comprises determining whether the H expression in the A→H axiom is an existential expression by comparing the H expression to examples of existential expressions; and
    in response to the H expression being determined to be the predetermined expression:
        collecting, using a generating processing device, from the existing axioms, a B→I axiom in which the B expression comprises the H expression;
        deleting, using the generating processing device, the A→H axiom from the existing axioms; and
        generating, using the generating processing device, a new B→I axiom from the collected B→I axiom by replacing the H expression in the B expression with the A expressions,
    wherein H, A, B, and I are logical expressions related to one another by the existing axioms.

2. The method of claim 1, further comprising adding, using an adding processing device, the new B→I axiom to the existing axioms.

3. The method of claim 1, wherein the example existential expressions are $\exists R.C$ or $\geq n\, R$ ($n>0$), wherein R is a variable, C is a logical expression satisfied by at least one value of R, and n is an integer specifying a quantity of values taken on by R, that are used to determine if H is an existential expression.

4. A method of managing an axiom, the method comprising:
    determining, using a determining processing device, whether an A expression or an H expression in an A→H axiom in existing axioms is a predetermined expression, wherein the determining comprises determining whether the H expression in the A→H axiom is a disjunction expression by comparing the H expression to examples of disjunction expressions and/or whether the A expression in the A→H axiom is a negation expression by comparing the A expression to examples of negation expressions; and in response to the A expression or the H expression being determined to be the predetermined expression, deleting, using a generating processing device, the A→H axiom from the existing axioms, wherein H, and A are logical expressions related to one another by the existing axioms.

5. The method of claim 4, wherein example disjunction expressions are {o1, o2, . . . , ok} (k>1), or ≤n R, or C∪D, wherein each o is an element of a set of logical expressions, k is a number of such elements, R is a variable that assumes n or fewer values, where n is an integer, C is a logical assertion and D is a logical assertion, at least one of which is true, that are used to determine if H is a disjunction expression.

6. The method of claim 4, wherein the example negation expressions are ∀R.C, or ⊥, or ≤n, or ≥n R (n>0), or ¬A(atomic negation), or ¬T wherein R is a variable, C is a logical expression satisfied by all values of R, n is an integer, and ¬A is a negation of the atomic expression A, and T is a negated logical expression, that are used to determine if A is a negation expression.

7. An apparatus for managing an axiom, the apparatus comprising:

a determining processing device configured to determine whether an H expression in an A→H axiom in existing axioms is a predetermined expression, wherein the determining comprises determining whether the H expression in the A→H axiom is an existential expression by comparing the H expression to examples of existential expressions; and a generating processing device configured to, in response to the H expression being determined to be the predetermined expression:

collect, from the existing axioms, a B→I axiom in which the B expression comprises the H expression;

delete the A→H axiom from the existing axioms; and generate a new B→I axiom from the collected B→I axiom by replacing the H expression in the B expression with the A expressions wherein H, A, B, and I are logical expressions related to one another by the existing axioms.

8. The apparatus of claim 7, further comprising an adding processing device configured to add the new B→I axiom to the existing axioms.

9. The apparatus of claim 7, wherein the example existential expressions are ∃R.C or ≥n R (n>0), wherein R is a variable, C is a logical expression satisfied by at least one value of R, and n is an integer specifying a quantity of values taken on by R that are used to determining if H is an existential expression.

10. A reasoning apparatus comprising:

a terminological box (TBox) apparatus containing axioms and configured to:

determine whether an H expression in an A→H axiom in the axioms in the TBox is a predetermined expression, wherein the determining comprises determining whether the H expression in the A→H axiom is an existential expression by comparing the H expression to examples of existential expressions, and in response to the H expression being determined to be the predetermined expression:

collect, from the axioms in the TBox apparatus, a B→I axiom in which the B expression comprises the H expression;

delete the A→H axiom from the axioms in the TBox apparatus; and generate a new B→I axiom from the collected B→I axiom by replacing the H expression in the B expression with the A expression, wherein H, A, B, and I are logical expressions related to one another by the existing axioms; and a reasoner apparatus configured to:

receive, from the TBox apparatus, an axiom in the axioms in the TBox apparatus; and perform reasoning based on the axiom received from the TBox apparatus.

11. The reasoning apparatus of claim 10, wherein the TBox apparatus is further configured to add the new B→I axiom to the axioms in the TBox apparatus.

12. The reasoning apparatus of claim 10, wherein the example existential expressions are ∃R.C or ≥n R (n>0), wherein R is a variable, C is a logical expression satisfied by at least one value of R, and n is an integer specifying a quantity of values taken on by R, that are used to determine if H is an existential expression.

* * * * *